United States Patent
Scott et al.

(10) Patent No.: US 9,652,279 B1
(45) Date of Patent: *May 16, 2017

(54) REMOTELY INTERACTING WITH A VIRTUALIZED MACHINE INSTANCE

(71) Applicant: Amazon Technologies, Inc., Seattle, WA (US)

(72) Inventors: Jonathan N. Scott, Snohomish, WA (US); George Oliver Jenkins, Redmond, WA (US); Vikram V. Sahijwani, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,476

(22) Filed: Jan. 25, 2016

Related U.S. Application Data

(63) Continuation of application No. 13/563,940, filed on Aug. 1, 2012, now Pat. No. 9,244,743.

(51) Int. Cl.
  *G06F 9/455* (2006.01)
  *G06F 9/54* (2006.01)

(52) U.S. Cl.
  CPC .......... *G06F 9/45558* (2013.01); *G06F 9/542* (2013.01); *G06F 2009/4557* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 7,260,820 B1* | 8/2007 | Waldspurger | G06F 9/545 709/203 |
| 7,694,298 B2 | 4/2010 | Goud et al. | |
| 7,987,305 B2 | 7/2011 | Blair et al. | |
| 8,060,877 B1* | 11/2011 | Waldspurger | G06F 9/545 711/6 |
| 8,219,990 B2 | 7/2012 | Khanna | |
| 8,250,586 B2* | 8/2012 | Nelson | G06F 9/45533 711/148 |
| 8,301,746 B2 | 10/2012 | Head et al. | |
| 8,635,616 B2 | 1/2014 | Yang et al. | |
| 8,667,207 B2 | 3/2014 | Knowles et al. | |
| 9,244,743 B1* | 1/2016 | Scott | G06F 9/5077 |
| 2006/0010440 A1 | 1/2006 | Anderson et al. | |
| 2011/0237234 A1 | 9/2011 | Kotani et al. | |

OTHER PUBLICATIONS

Barham et al. "Xen and the Art of Virtualization", 2003 ACM, 14 pages.*
Huylebroeck et al. "Opening the clouds: qualitative overview of the state-of-the-art open source VM-based cloud management platforms", 2009 ACM, 21 pages.*

(Continued)

*Primary Examiner* — Van Nguyen
(74) *Attorney, Agent, or Firm* — Lee & Hayes, PLLC

(57) ABSTRACT

A system and method for remotely interacting with a virtualized machine instance (VMI) through a trigger mechanism resident at the VMI. When the VMI receives a request via the trigger mechanism, the VMI responds to the request, such as by obtaining a program and executing the program locally at the VMI.

20 Claims, 5 Drawing Sheets

(56) References Cited

OTHER PUBLICATIONS

Final Office Action for U.S. Appl. No. 13/563,940, mailed on Apr. 22, 2015, Jonathan N. Scott, "Remotely Interacting With a Virtualized Machine Instance", 15 pages.
Office action for U.S. Appl. No. 13/563,940, mailed on Aug. 27, 2014, Scott et al., "Remotely Interacting With a Virtualized Machine Instance", 18 pages.

* cited by examiner

REMOTELY INTERACTING WITH A VIRTUALIZED MACHINE INSTANCE

CROSS REFERENCE TO RELATED APPLICATION

This application is a continuation of, and claims priority to commonly owned U.S. patent application Ser. No. 13/563,940, filed Aug. 1, 2012, now U.S. Pat. No. 9,244,743, entitled "REMOTELY INTERACTING WITH A VIRTUALIZED MACHINE INSTANCE," the entirety of which is herein incorporated by reference.

BACKGROUND

Large-scale, network-based computing represents a paradigm shift from traditional client-server computing relationships. With large-scale, network-based computing platforms (e.g., data centers), customers are able to leverage shared resources on-demand by renting resources that are owned by third parties and that reside "in the cloud." With these resources, customers of the platform are able to launch and maintain large applications without actually owning or servicing the underlying infrastructure necessary for these applications. As such, network-accessible computing platforms, often referred to as 'cloud-computing platforms' or "cloud-computing environments," have expanded the class of individuals and companies able to effectively compete in the realm of computing applications.

Generally, customers of a network-based computing platform launch and maintain large applications within the network-based computing platform through the use of one or more virtualized machine instances (VMI). VMIs can be created by the network-based computing platform and many VMIs can be instantiated and controlled by a single-network based computing platform. The VMIs can be in continuous operation for a customer within the cloud, and thus, can be critical in operation to the customer such that failure of a VMI would have serious repercussions to the customer.

However, just like the software on actual computers, the software functionality in the VMI must be updated and maintained. Typically, this is accomplished by connecting to the VMI through a network, or other data transfer route, into the VMI such that the code, such as a patch or script, can be loaded into the VMI through the standard data intake mechanism and then executed to update the VMI. One problem arises however in that the VMI must devote resources for the data transfer operations, where such resources are also being allocated for typical usage in the operation of the VMI. Moreover, should a large number of VMIs need updating, the time frame for the update is delayed until the VMIs can allocate the resources to effect the code import and execute it. If the update is extremely urgent, then any delay in getting the instantiated VMIs updated could prove detrimental to the operation of the VMIs and harmful to the customers that use them.

DETAILED DESCRIPTION

This disclosure describes a system and method for remotely interacting with a virtualized machine instance (VMI) through a trigger mechanism resident at the VMI. When the VMI receives a request via the trigger mechanism, the VMI responds to the request, such as by obtaining a program and executing the program locally at VMI, or otherwise alters functionality based upon the trigger. In one embodiment, the system for remotely triggering a function on one or more virtualized machine instances (VMIs) includes a computer platform that selectively provides one or more VMIs that are accessible to one or more client devices across a network. A VMI manager is resident on the computer platform that, at least, maintains the operation of the one or more VMIs, and the VMI manager is configured to instantiate a VMI such that the VMI includes at least a trigger mechanism configured to selectively receive one or prompts from the VMI manager to alter VMI functionality.

In one embodiment, the trigger mechanism polls the VMI manager to determine if VMI functionality requires alteration, the VMI manager pushes a notification that causes the trigger mechanism to poll the VMI manager, and/or the VMI manager pushes information to the VMI. In an example embodiment, the trigger mechanism is an application programming interface (API) to the VMI manager. The trigger mechanism can be configured to alter the VMI through obtaining and executing one or more computer programs, or alternately, can change functionality at the VMI. In another embodiment, the VMI manager is further configured to instantiate the VMI such that the VMI indicates to the VMI manager that at the VMI has been altered, thus confirming the successful execution of the trigger mechanism.

The system can include a server, or other computer platform that selectively hosts one or more application programming interfaces (APIs) accessible on a network. The APIs are accessible to the one or more client devices across a network such that each API can be invoked and one or more messages can be sent to the server that hosts the VMI. A VMI manager running on the host can receive the one or more messages and selectively interact with a trigger mechanism at the VMI.

In accordance with various embodiments, the shared computing environment is a network-accessible computing platform (commonly referred to as a "cloud" computing environment). For instance, one or more entities may host and operate a network-accessible computing platform that includes different types of network resources, such as a storage service, a load balancing service, a compute service, a security service, or any other similar or different type of network-accessible service. The services are performed using various computing devices, wherein the computing devices include one or more processors that each includes one or more processing cores.

Figure 1:
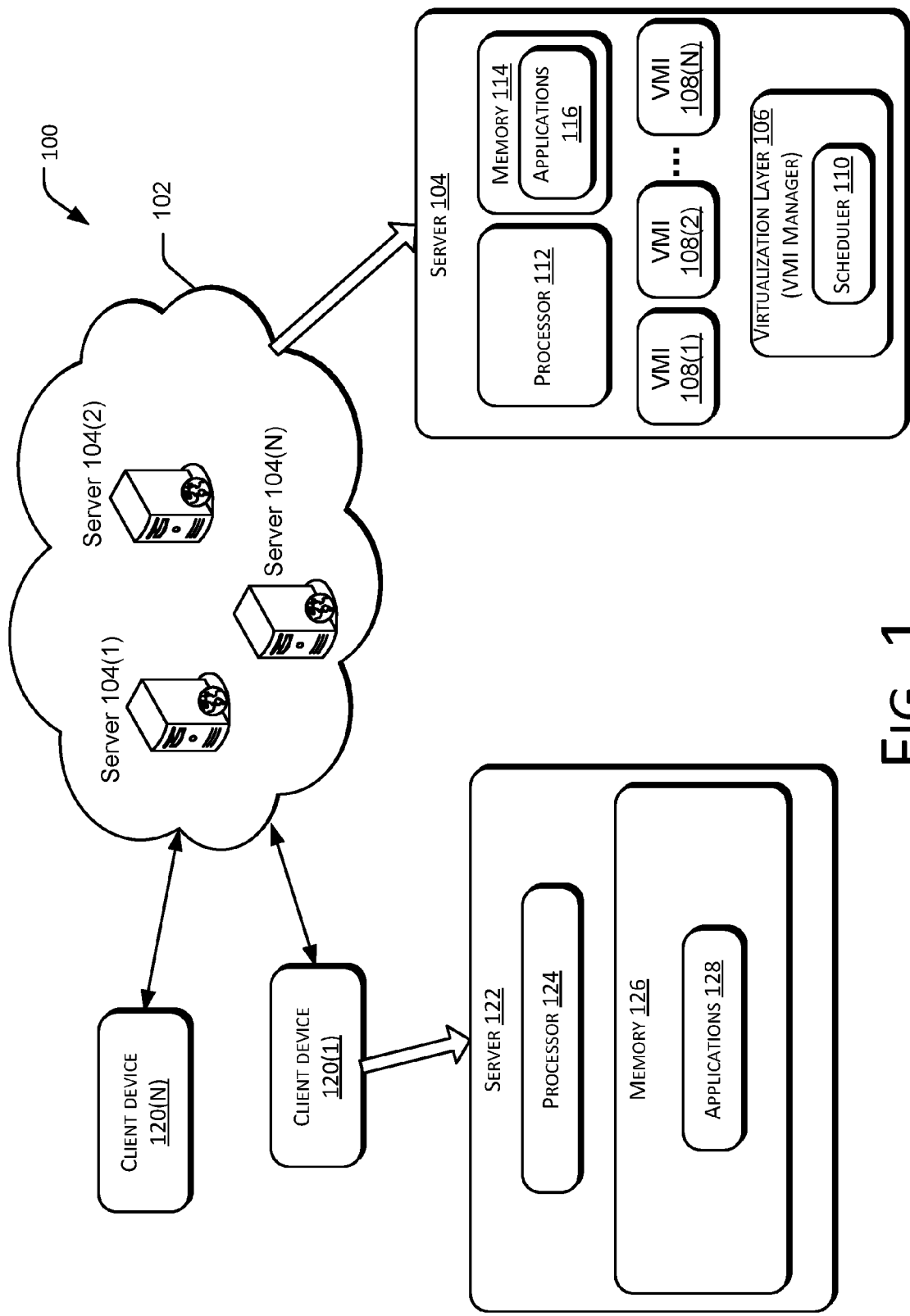
FIG. 1 illustrates an example of a computing environment in which VMIs are uploaded to a network-accessible computing platform and provided to a client device.

FIG. 1 illustrates an environment 100 for instantiating VMIs utilizing a cloud-based environment. The environment of FIG. 1 includes a network-accessible computing platform or services provider 102 that provides network-accessible computing services via a network of computing devices represented as one or more servers 104(1), 104(2), . . . , 104(N), which may include both resources and functionality. The network-accessible computing platform 102 and its services may be referred to as Infrastructure as a Service (IaaS) and/or Platform as a Service (PaaS). The computing devices available to provide computing services within the network-accessible computing platform 102 may be in the form of dedicated servers, shared servers, virtual servers, server slices, processors, processor cycles, and so forth. While FIG. 1 illustrates the computing devices in the form of servers 104, this is not meant to be limiting and is presented as such simply for ease and clarity.

As illustrated, each of the servers 104 may include a virtualization layer 106, such as a hypervisor or a VMI manager (VMM) that can create one or more virtual machine images (VMI) 108(1), 108(2), . . . 108(N) for sharing resources of the server 104, if creation of the one or more virtual machine images 108 is needed. As illustrated, the virtualization layer 106 may also include a scheduler 110. The scheduler 110 may generally control processing cores of processors to perform various functions and execute various instructions within the network-accessible computing platform 102 on behalf of the virtual machine images 108. While FIG. 1 illustrates the scheduler 110 as residing within the virtualization layer 106, the scheduler 110 may reside in other locations in other implementations.

Each of the servers 104 also generally includes one or more processors 112 and memory 114, which may comprise any sort of computer-readable storage media and may store one or more applications 116. The servers may also include one or more other components typically found in computing devices, such as communication connections, input/output I/O interfaces, and the like. The hypervisor, VMM or any of the software management layers shown herein can be uniformly executed in the same program space on the same server 104, or can be broken out individually based upon functionality and the programs can be resident on several servers.

One or more client devices 120(1), 120(2), . . . , 120(N) communicate and interact with the network-accessible computing platform 102 in order to obtain computing services from the network-accessible computing platform 102. The client devices 120 communicate with the network-accessible computing platform 102 via a network, such as, for example, the Internet and communication connections and I/O interfaces. Generally, the computing services from the network-accessible computing platform 102 are available to the client devices 120 in scalable increments or amounts, which can be dynamically increased or decreased in response to usage and/or demand. Service fees may be tied to the amount of the resources that are actually used.

Generally, the client devices 120 are in the form of one or more servers 122. However, this is not meant to be limiting and it is presented as such for ease and clarity. Similar to the network-accessible computing platform 102, each of the one or more servers 122 that make up a client device 120 generally includes one or more processors 124 and memory 126. The memory 126 generally has stored therein one or more applications 128. These various modules and associated techniques will be further described in more detail herein.

The computing services available from the network-accessible computing platform 102 may include functional elements or services. Functional elements or services may comprise applications or sub-applications that are used as building blocks for client device applications. For example, the network-accessible computing platform 102 may provide predefined database functionality in the form of a discrete service that can be instantiated on behalf of a client device. Functional components may relate to network communications and other services or activities. Network-related services may, for example, include firewalls, load balancers, filters, routers, and so forth. Additional functional components may be available for such things as graphics processing, language translation, searching, etc.

The computing services may also be characterized by service types or categories, such as by the types or categories of services they provide. Different types or categories of services may include database services, web servers, firewalls, file replicators, storage services, encryption services, authentication services, and so forth. In some embodiments, services may be categorized at a relatively high level. For example, a "database services" category may include various different implementations of database services. In other embodiments, services may be categorized more specifically or narrowly, such as by type or family of database services. In embodiments such as this, for example, there may be different categories for relational databases services and non-relational database services, and for SQL and other implementations of databases services.

Service parameters for the computing services provided by the network-accessible platform 102 may correspond to options, configuration details, speeds, capacities, variations, quality-of-service (QoS) assurances/guaranties, and so forth. In the example of a database service, the service parameters may indicate the type of database (relational vs. non-relational, SQL vs. Oracle, etc.), its capacity, its version number, its cost or cost metrics, its network communication parameters, and so forth.

Figure 2:
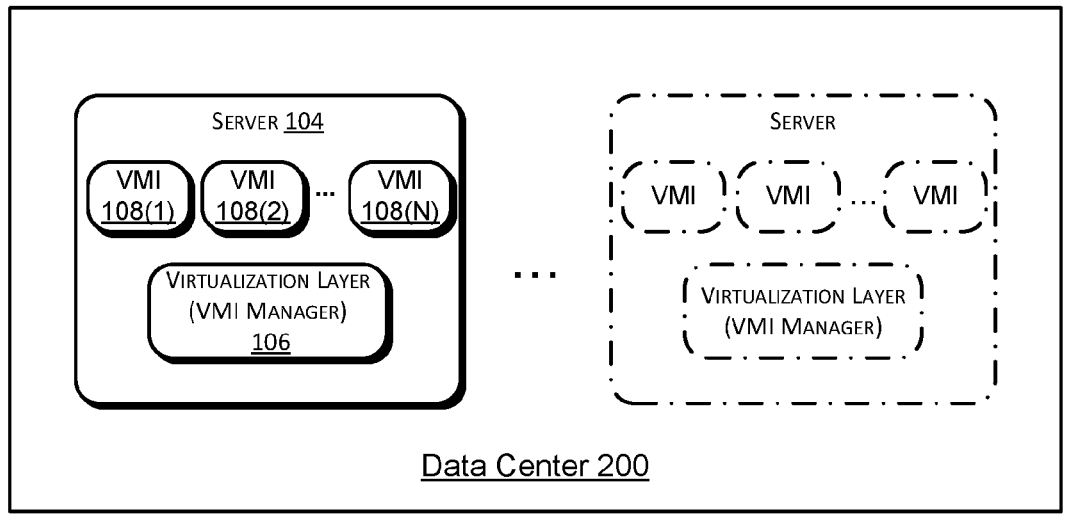
FIG. 2 illustrates an example of a series of servers in a data center servicing a plurality of VMIs.

With reference to FIG. 2, the present system, in one embodiment, instantiates the VMIs 108(N) such that programmatic interaction of VMIs is available with a computer platform such as network-accessible computing platform 102 that selectively provides one or more VMIs that are each accessible to one or more client devices 120 across a network. Such interaction can be the execution of a program, such as a patch, code or update, or can be changing the operational characteristics of the VM1, resetting passwords or other security, gathering operational metrics of the VMI, or causing reconfiguration of the operational components.

The computer platforms can be resident on one or more servers 104, which can be in a data center 200 and managed as cloud computing resources, as are known in the art. A VMI manager, such as a hypervisor, or virtualization layer 106 resident on or accessible to the computer platform 102 that, at least, maintains the operation of the one or more VMIs on behalf of one or more customers. The VMI manager will instantiate each VMI 108(N) such that the VMI includes at least one trigger mechanism, such as an application programming interface (API) or an agent. In an example embodiment, the trigger mechanism can be used to interact with operating systems or applications running in the VMI so as to, for example, selectively receive one or more computer programs (such as a patch or script) from the VMI manager (virtualization layer 106) that can be executed within the VMI. The trigger mechanism can also be implemented as an event channel, common data store, a hyper-call or other command level access between the VMI and the VMI manager.

In one embodiment, the API of the VMI 108(N) can be used to poll the VMI manager to determine if there are any trigger prompts, such as prompts indicating one or more computer programs are to be received and executed within the instantiated VMI. For example, the VMM 106 can run a web server and a program running in the VMI 108(N) can periodically issue web service calls to the web server to determine if there are any trigger prompts. Alternately, the VMI manager 106 can push prompts out to the VMI. Furthermore, VMI can report information to the VMI indicating to the VMI manager that the functionality at the VMI has been altered as requested.

The system and method accordingly provide the ability for the instantiated VMI 108(N) to be patched, updated, or otherwise have programs selectively executed without needed to open a data port or other data path access to the VMI. Thus, no network traffic needs to be passed to the VMI as all communication is inherently secured locally in the hypervisor (virtualization layer 106).

Figure 5:
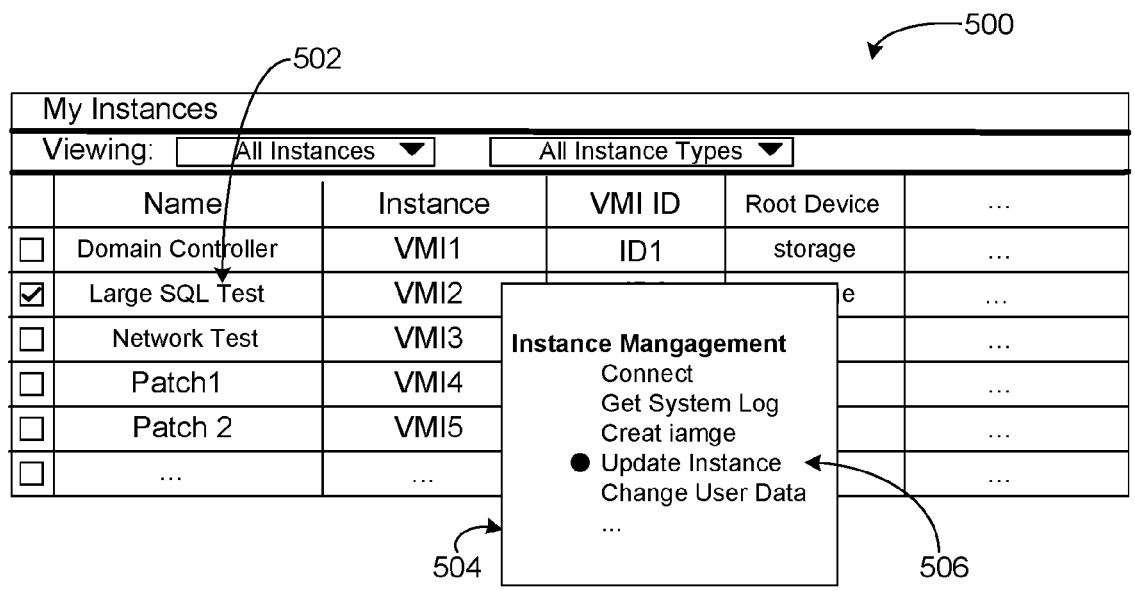
FIG. 5 is one embodiment of a customer interface that allows the customer at the client device to purposely alter functionality with an instantiated VMI.

Moreover, communication can even occur if the VMI 108(N) is off the network, or if the firewall of the VMI is set to allow no communications. In one embodiment, when the VMI is instantiated, it will contain the code that causes an API to be the trigger mechanism for updating code, such as patching, enabling or disabling network adaptors, or performing configurations that would otherwise require a physical console or the VMI to be reachable on the network. The system can also be embodied to allow customers (such as client devices 102) to remotely patch their VMIs without having to open up any ports, as is shown in FIG. 5 herein. And importantly, an emergency roll-out of updates to VMIs can occur quickly without waiting for the VMI to have the requisite ability to invoke the standard data communication paths.

Figure 3:
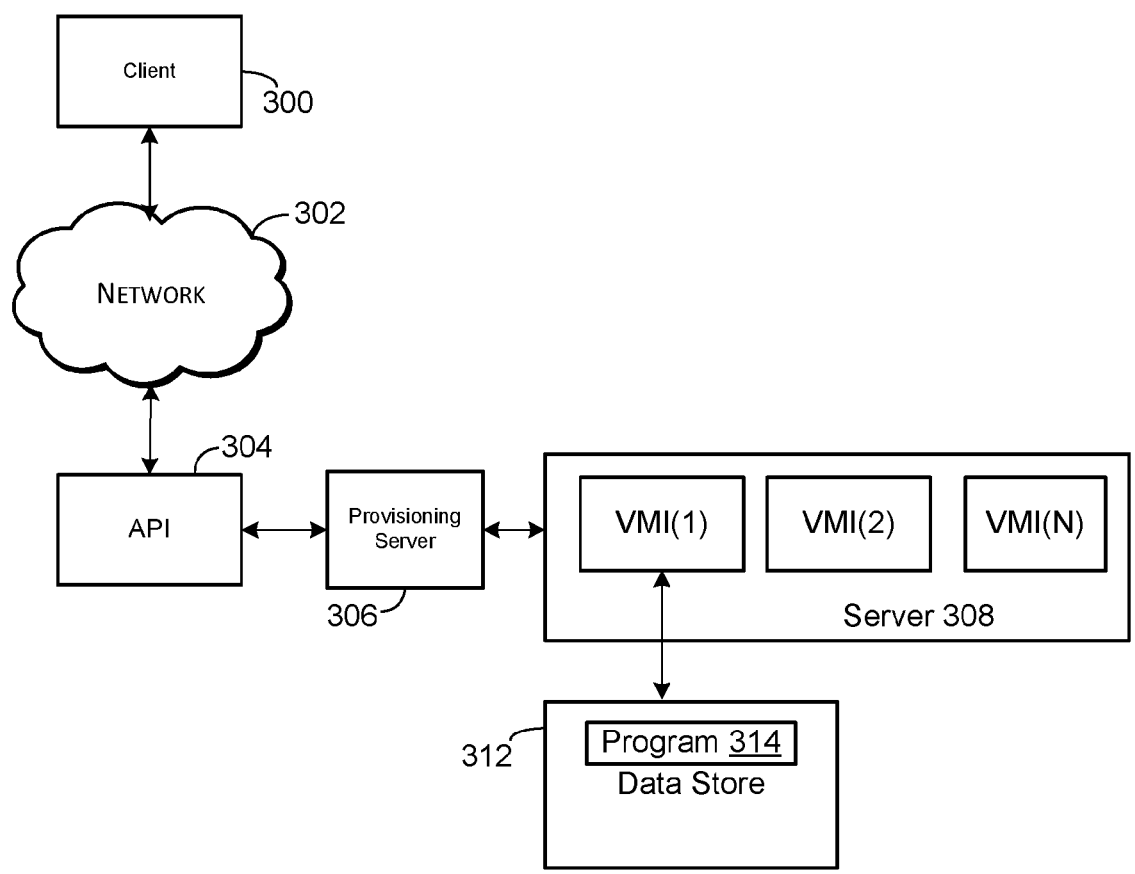
FIG. 3 is a block diagram illustrating one embodiment of a service provider environment for VMIs that are accessible by a client device.

FIG. 3 is a block diagram illustrating one embodiment of a service provider environment for VMIs that are accessible by a client device 330. The client 300 can be a computer with a browser or a software development kit that includes code to invoke the API or trigger mechanism at the VMI (such as VMI(1)-VMI(N) on server 308). The client 300 is connected through a network 302 (which can be the Internet, or other public and private networks) to an API server 304, which can be a web server configured to receive API calls or send web pages to clients. The API server 304 receives client 300 requests, and de-serializes the API calls and sends the substance of the requests to the provisioning server 306. For example, the client 300 can issue an HTTP operation such as a GET or PUT operation to the API server 304 that includes information such as an access key or key identifier, a digital signature, an action, and any needed parameters. The action can describe how to interact with the VMI, e.g., the action could be "Patch," "Reset Credentials," "Report metrics," "Run program," and the parameters could identify what patch or apply or program to run and the identifier for the VMI or VMIs. The API server 304 can de-serialize the API call and send the data to provisioning server 306. The provisioning server 306 then authenticates the user using the access key or key identifier and the digital signature and determines whether the user is authorized to invoke the command. Here, an access control policy can be invoked. Assuming the user is authorized, the provisioning server 306 determines where the VMI is in the provider network (such as VMIs that are accessible on server 308) and sends a message to the server 308 hosting the VMI. Such access can all occurs over the control plane for the VMIs. Conversely, traditional user traffic runs on the data plane though separate management channels to send commands to servers. The server 308 that receives the message and determines the VMI to communicate with. The server 308 can optionally authenticate the message to make sure the message is valid. The server 308 then uses the trigger interface to deliver a message to the VMI using an API, a hyper-call, or an agent as is shown more particularly in FIG. 4.

In FIG. 3, the system is shown as embodied with a common data store 312 that has a resident program 314 that is to be obtained and executed by the VMI. Thus, this architecture would correspond to the process illustrated in FIG. 7 where the client 300 will have the VMI instance look to another network location for a program or other command or data. In one embodiment, the trigger mechanism itself can be the common data store 312 wherein the mere presence of a program, etc., is the triggering event. Thus, in operation, the provision server 306 would push the program, data, etc., to the data store 312, and such would serve as a prompt to the VMI. The VMI, in this embodiment, would thus periodically check the data store 312 to see if any data is present.

Figure 4:
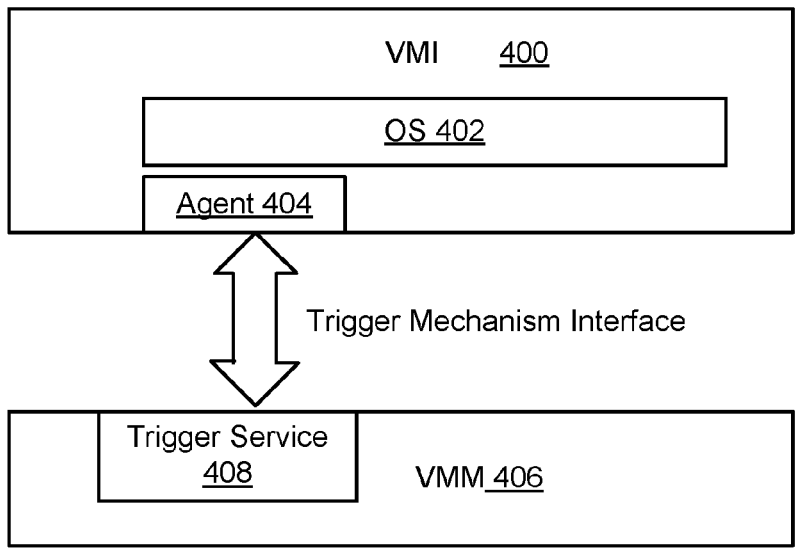
FIG. 4 is a block diagram of one embodiment of a trigger mechanism interface with the control plane of the VMI Manager.

FIG. 4 is a block diagram of one embodiment of a trigger mechanism interface with the trigger service 408 of the VMI Manager (VMM) 406 and the trigger mechanism embodied as an agent 404 resident at the VMI 400. In an embodiment, the VMM 406 can communicate with the agent 404 in the VMI 400 via an event channel or other command level interface. In one embodiment, the trigger mechanism interface allows the agent 404 and the VMM 406 to communicate via asynchronous inter-domain notifications through ring buffers in shared memory pages.

Alternately, the trigger mechanism interface can allow the VMM 406 to deliver a bit to the agent 404 that indicates that a prompt has arrived. This causes the agent 404 to check the data store 312 (FIG. 3) to get the request. The agent 404 can obtain the prompt and optionally the program to be applied from the shared data store 312. The agent 404 can then otherwise take an action in the VMI 400 in response to the prompt, such as applying patches to the VMI OS 402, disabling network cards or other data paths, gather performance metrics, etc.

FIG. 5 is one embodiment of a customer interface 500 that allows the customer at the client device (client 300 in FIG. 3) to interact with an instantiated VMI using a graphical user interface. In this embodiment, the client 300 has a browser that obtains a webpage that shows the list of instances associated with the user's account. For example, an SQL test 502 can be requested for the VMI2 instance (which is resident on server 308 in FIG. 3). A command window 504 will come up that allows the user to specifically update the VMI instance (update instance 506) with the SQL test 502 function. Other features, such as patches, network tests, and domain switching are likewise possible on the one or more identified instances.

It should be noted that the system can be embodied such that the client 300 (FIG. 3) uses a software development kit such that the client can programmatically invoke the commands instead of doing it through a browser, as described above. The customer interface 500 is merely shown as illustrative of one embodiment where the client can have command level access to instantiated VMIs.

Figure 6:
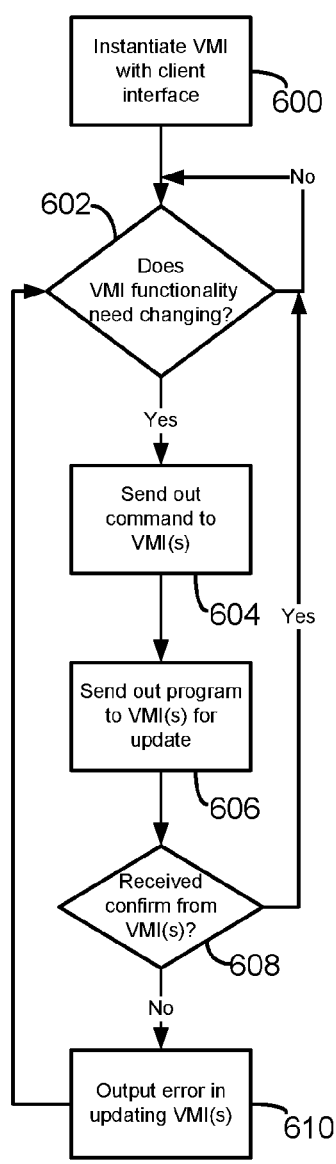
FIG. 6 illustrates one embodiment of a process executing on the VMI Manager to instantiate a VMI and then cause the VMI to update its operation with one or more computer programs through a command API at the VMI.
Figure 7:
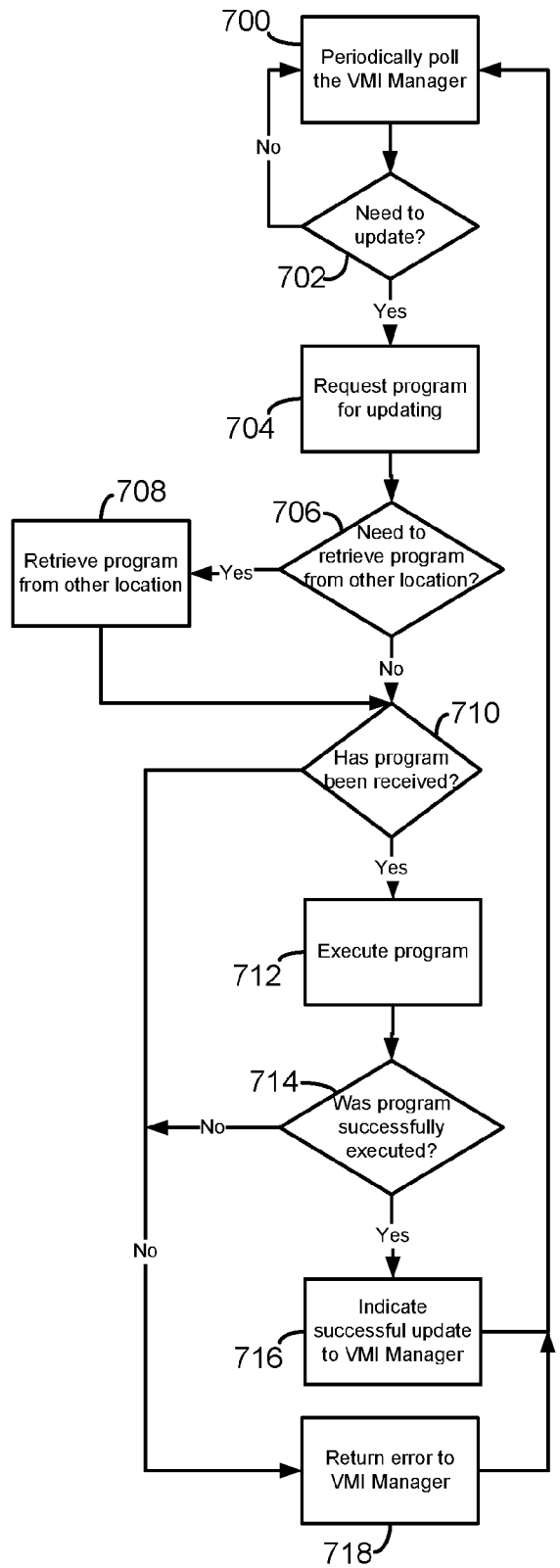
FIG. 7 illustrates one embodiment of a process executing within a VMI to periodically pool the VMI manager and selectively import one or more computer programs for execution therein.

FIGS. 6 and 7 are processes that the architecture of FIGS. 1, 2 and 3 may implement. These processes (as well as other processes described throughout) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible computing platforms, the architectures and techniques are equally applicable to other computing environments and computing devices.

FIG. 6 illustrates one embodiment of a process executing on the VMI Manager (virtualization layer 106) to instantiate a VMI 108(N) and then cause the VMI to update its operation with one or more computer programs through a command API at the VMI. The VMI is instantiated with a trigger interface, as shown at step 600, such that a customer, at the client 102, can use the VMI manager to interact with the VMI such as by trigger computer program intake and updating at the VMI. In response to receipt of a request to interact with the VMI, a determination is then made as to whether one or more programs need to be updated within the VMI, as shown at decision 602. If no program needs updating at decision 602, the process iterates at the decision to await an update command or indication. When one or more programs need updating at decision 602, then the process sends out a command to the VMI that it needs to update its resident code, as shown at step 604.

In this embodiment, then VMI manager then pushes out the program(s) that are to be executed in the instantiated VMI, as shown at step 606. Thus, here, the VMI manager is causing the trigger and pushing out programs for updating. Then a determination is made as to whether the VMI has confirmed that the program(s) has been received and executed at the VMI, as shown at decision 608. If confirmation has been received at decision 608, then the process iterates to decision 602 to await further updating of the program(s) at the VMIs. Otherwise, if confirmation is not received at decision 608, then an error is output to the VMI manager, as shown at step 610, indicating that the update was not successful and the process again iterates to decision 602 to await further updating.

It should be noted that several functionalities are included in the process of FIG. 6 that are merely shown for illustration, such as the sending of programs at step 604 and the confirmation receipt of decision 608. Other functionalities can likewise be added to the process of FIG. 6 to enhance the ability to update the VMI(s) without causing a data port or other communication pathway to necessarily open.

FIG. 7 illustrates one embodiment of a process executing within an instantiated VMI to periodically poll the VMI manager (virtualization layer 106) and selectively import one or more computer programs for execution therein. The VMI manager is periodically polled by the VMI, as shown at step 700, and then a determination is made as to whether a resident program(s) needs to be updated, as shown at decision 702. If not program(s) need updating at decision 702, then the process iterates to step 700 to periodically poll the VMI manager. It should be noted that this embodiment of polling the VMI manager for updates is not necessary in push-command update, as shown in FIG. 3. If the program(s) need updating at decision 702, then the VMI requests the program for updating as shown at step 704, and a decision is then made as to whether the program(s) needed for update are to be obtained from a different network location, as shown at decision 706. Thus, in this embodiment, the VMI can obtain program(s) (code, scripts, patches, etc.) from other locations, such as those provided by a customer.

If the program needs to be retrieved at another location at decision 706, then the program is retrieved from the location, as shown at step 708. Otherwise, if the program does not need to be retrieved from another location, or once the program is retrieved at step 708, a determination is made as to whether the program has been received as shown at decision 710. If the program needed for updating has not been received by the VMI at decision 710, then an error is returned to the VMI manager as shown at step 718, and then the process iterates to again periodically poll the VMI manager at step 700.

Otherwise, if the program for updating has been received at decision 710, then the received program is executed as shown at decision 712, and a determination is made as to whether the program was successfully executed at the VMI, as shown at decision 714. If the program was not successfully executed at decision 714, then an error is returned to the VMI manager at step 718, and the process iterates to periodically poll the VMI manager as shown at step 700. Otherwise, if the program was successfully executed at the VMI at decision 714, the successful execution is indicated to the VMI manager as shown at step 716, and the process iterates to periodically poll the VMI manager at step 700. In this embodiment, the confirmation from the VMI of program execution at step 716 will interface with the confirmation determination of the VMI manager at decision 608 in FIG. 6.

Figure 8:
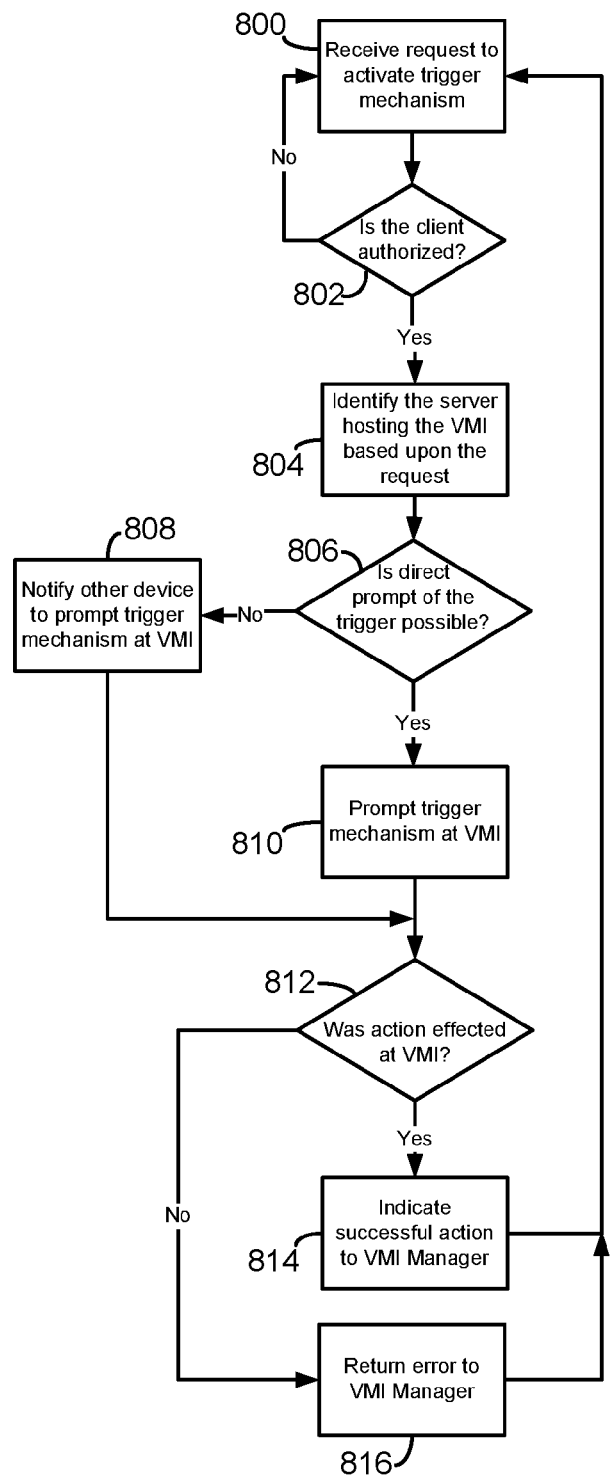
FIG. 8 illustrates one embodiment of a process executing on a server providing an API to client devices to allow the clients to prompt the trigger mechanism in the VMI.

FIG. 8 illustrates one embodiment of a process executing on a server, such as server 104(N) in FIG. 1, providing an API to client devices 120(N) to allow the clients to prompt the trigger mechanism in the VMI 108(N). A request is received at the server 104(N) from a client device 120(N) host the API to activate a trigger mechanism in one or more VMIs, as shown at step 800, and then a determination is made as to whether that client is authorized to activate the trigger mechanism as requested, as shown at decision 802. If not authorized at decision 802, then the process iterates to step 800 to await a new request from an API at a client device 120(N). If the client device 120(N) is authorized at decision 802, then the physical server hosting the VMI that the request is for is identified as shown at step 804, and a decision is then made as to whether the direct prompting of the trigger mechanism of the VMI is possible, as shown at decision 806.

Thus, in this embodiment, the server 104(N) can either directly locate the server of the VMI and prompt the trigger mechanism, or can notify another device to cause the trigger mechanism to be prompted. It should be noted that either of these paths can be the sole mechanism to attempt to prompt the trigger mechanism at the VMI.

Thus, if another computer device needs to prompt the VMI trigger mechanism at decision 806, then the other device is notified to prompt the VMI trigger mechanism, as shown at step 808. Otherwise, if the direct triggering of the VMI is possible at decision 806, then the trigger mechanism is directly prompted as shown at step 810. Once the other device is notified at step 808, or the trigger mechanism has been prompted at step 810, a determination is made as to whether the action was effected at the VMI as shown at decision 812.

If the action has not been effected the VMI at decision 812, then an error is returned to the VMI manager as shown at step 816, and then the process iterates to again await another request from a client device 120(N) at step 800. Otherwise, if the action has been successfully effected at decision 812, the successful execution is indicated to the VMI manager as shown at step 814, and the process iterates to await further requests from the client device 120(N) at step 800.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   selectively providing one or more virtualized machine instances (VMIs) that are accessible to one or more client devices across a network;
   providing a VMI manager associated with a VMI of the one or more VMIs, the VMI including at least one trigger mechanism; and
   receiving, at the VMI manager and from the at least one trigger mechanism at multiple different times, poll messages to determine an existence of a trigger prompt indicating a program to be received and executed within the VMI.

2. The method of claim 1, wherein the at least one trigger mechanism is an application programming interface (API).

3. The method of claim 1, instantiating, by the VMI manager, the VMI such that the VMI indicates to the VMI manager that the VMI has been altered.

4. The method of claim 1, further comprising:
   retrieving the program in response to determining the existence of the trigger prompt, and
   executing the program to update a resident program of the VMI.

5. A system comprising:
   one or more computing devices of a computer platform that selectively provide one or more virtualized machine instances (VMIs) accessible to one or more client devices across a network, at least one of the one or more computing devices of the computer platform further including a VMI manager associated with a VMI of the one or more VMIs, the VMI including at least one trigger mechanism to poll the VMI manager at multiple different times to determine if functionality of the VMI requires alteration.

6. The system of claim 5, wherein the VMI manager is further to push one or prompts to the at least one trigger mechanism of the VMI.

7. The system of claim 5, wherein the at least one trigger mechanism is to alter the VMI through obtaining and executing one or more computer programs.

8. The system of claim 7, wherein the VMI manager is to provide an ability to the one or more client devices to send the one or more computer programs for execution in the VMI.

9. The system of claim 5, wherein the VMI manager is further configured to instantiate the VMI such that the VMI indicates to the VMI manager that the functionality of the VMI has been altered.

10. The system of claim 5, wherein the at least one trigger mechanism is instantiated to receive a command from the VMI manager to obtain one or more computer programs from other computer resources accessible to the VMI on the network.

11. The system of claim 5, wherein the VMI manager is to instantiate the at least one trigger mechanism such that the VMI includes a control plane that is accessible to the one or more client devices across the network.

12. The system of claim 5, wherein the computer platform is further to provide an interface to at least one of the one or more client devices to alter specific functionality in the VMI.

13. The system of claim 5, wherein the VMI is instantiated to include an application programming interface (API) for communication to the VMI manager.

14. The system of claim 5, wherein the at least one trigger mechanism is an agent at the VMI.

15. The system of claim 5, further comprising a web server to:
   receive application program interface (API) requests to interact with individual VMIs of the one or more VMIs from individual client devices of the one or more client devices; and
   in response to a request associated with the VMI, send one or more messages to a computing device of the computer platform to cause the VMI manager to interact with the VMI via the at least one trigger mechanism.

16. A method comprising:
   selectively providing one or more virtualized machine instances (VMIs) accessible to one or more client devices across a network, a VMI of the one or more VMIs including at least one trigger mechanism; and
   receiving, at a VMI manager and from the at least one trigger mechanism at multiple different times, poll messages to determine if functionality of the VMI requires alteration.

17. The method of claim 16, further comprising pushing, from the VMI manager, a prompt to the at least one trigger mechanism of the VMI.

18. The method of claim 16, further comprising:
   obtaining one or more computer programs; and
   executing the one or more computer programs within the VMI to alter the functionality of the VMI.

19. The method of claim 16, further comprising receiving notice from the VMI indicating that the functionality of the VMI has been altered.

20. The method of claim 16, wherein the VMI is instantiated to include an application programming interface (API) for communication to the VMI manager.

* * * * *